Oct. 3, 1933.  M. JENSEN  1,928,834
SPRING SHACKLE REPAIR MEANS
Filed Dec. 7, 1931
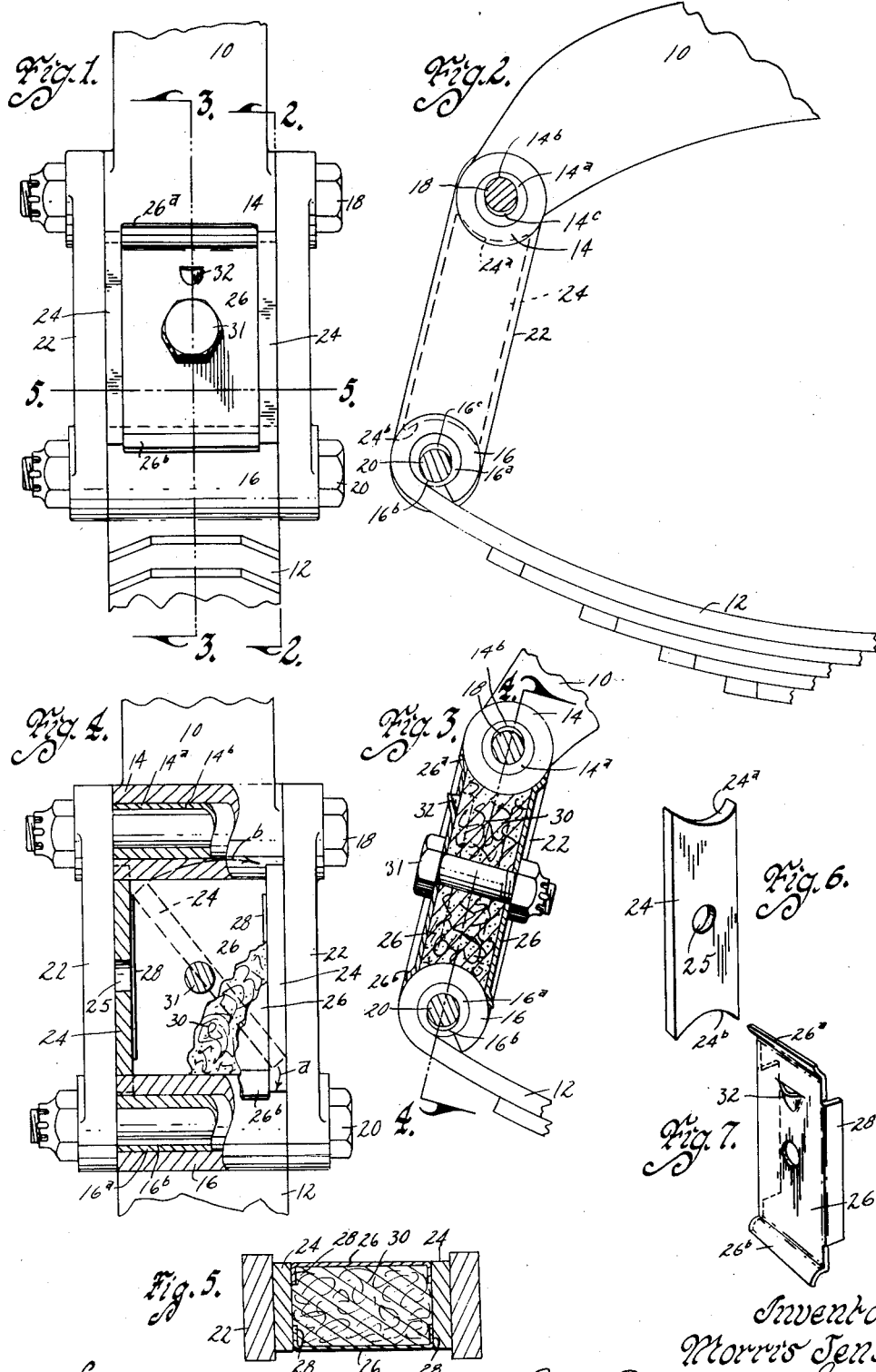
Inventor
Morris Jensen
By Bair, Freeman & Sinclair
Attorneys
Witness
Edw. Seeley Patented Oct. 3, 1933

1,928,834

UNITED STATES PATENT OFFICE 1,928,834

SPRING SHACKLE REPAIR MEANS

Morris Jensen, Pleasantville, Iowa

Application December 7, 1931. Serial No. 579,466

15 Claims. (Cl. 267—54)

The object of my invention is to provide a spring shackle repair means which is simple, durable and comparatively inexpensive to manufacture.

More particularly, it is my object to provide a repair means for spring shackles which entirely eliminates the purchase and installation of new shackles, shackle bolts and shackle bolt sleeves and yet eliminates the lost motion caused by excessive wear on the shackle bolts and the shackle bolt sleeves.

Still a further object is to provide for use with shackles, shackle bolts and shackle bolt bearings, thrust members adapted to be interposed between the shackle bolt bearings for the purpose of supporting one of the bearings relative to the other and thereby supporting the body of an automobile or other vehicle relative to the chassis thereof instead of imposing the weight of the body on the shackles, shackle bolts and shackle bolt bearings.

A further object is to provide such repair means in the form of a pair of thrust members for each shackle connection, each member comprising a bar of flat metal or the like having cupped ends to fit the shackle bolt bearings or eyes of the spring horn and spring of a vehicle so that the cupped ends in conjunction with the peripheries of the eyes form bearings which oscillate during the action of the spring with the weight of the body of the vehicle carried on the thrust members rather than on the shackle bolts.

Still a further object is to provide a cover means which serves the purpose of forming a pocket for absorbent material and lubricant for the shackle parts and thrust members as well as providing a spacer for the thrust members and a means to prevent the entrance of dust to the bearings formed at the ends of the thrust members.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is an end elevation of a spring horn, spring and shackles with my shackle repair means applied thereto.

Figure 2 is a sectional view on the line 2—2 of Figure 1 with my shackle repair means omitted except that one of the thrust members is shown in dotted lines and the shackle bolts are shown in section to illustrate excessive wear of the sleeves in which the shackle bolts are mounted.

Figure 3 is a similar sectional view as taken on the line 3—3 of Figure 1, showing my shackle repair means in section and illustrating the shackle bolts back in their proper position with the thrust members of my shackle repair means supporting the vehicle body relative to the chassis thereof.

Figure 4 is a sectional view on the line 4—4 of Figure 3.

Figure 5 is a sectional view on the line 5—5 of Figure 1; and

Figures 6 and 7 are perspective views of a thrust member and a cover member, respectively, of my shackle repair means.

On the accompanying drawing, I have used the reference numeral 10 to indicate a spring horn of an automobile body or the like. A spring of the automobile chassis is indicated at 12. Shackle bolt bearings 14 and 16 are provided on the horn 10 and the spring 12 and are ordinarily referred to as horn and spring eyes. Especially for the purpose of the claims, however, I will refer to them as shackle bolt bearings.

The bearings 14 and 16 are ordinarily provided with shackle bolt sleeves $14^a$ and $16^a$. Shackle bolts are indicated at 18 and 20 and are connected by shackles 22. In Figure 2, excessive wear of the shackle bolt sleeves $14^a$ and $16^a$ is indicated at $14^b$ and $16^b$. Because of the weight of the body of the automobile, this leaves spaces $14^c$ and $16^c$.

It will be obvious that the wear in the shackle connections is almost entirely on the surfaces $14^b$ and $16^b$, some of it of course occurring on the shackle bolts as well as on the sleeves $14^a$ and $16^a$. If the body of the automobile were lifted to eliminate the spaces $14^c$ and $16^c$, then the shackle bolts would be back in their central position with respect to the sleeves $14^a$ and $16^a$ as shown in Figure 3. This is their proper position and it will be obvious that ordinarily to retain the shackle connection parts in this position, new sleeves $14^a$ and $16^a$ and new bolts 18 and 20 must be purchased and installed. To eliminate such purchase and installation, however, I have provided thrust members 24 having cupped ends $24^a$ and $24^b$. As shown by dotted lines in Figure 2, these cannot be inserted when the parts are in their normal worn position because the ends $24^a$ and $24^b$ are farther apart than the distance between the bearings 14 and 16. The automobile body must therefore be raised as in Figure 3 to permit installation of the thrust members 24.

As shown by dotted lines in Figure 4, the thrust member may be inserted diagonally between the shackles 22 and then straightened up as indicated by the arrows a and b to a position against one of the shackles.

After both are inserted and pushed against the shackles, the weight of the body of the automobile may be imposed on the thrust members 24, but the shackle bolts will remain in practically the centralized position of Figure 3 with respect to the sleeves 14$^a$ and 16$^a$. The cupped ends 24$^a$ and 24$^b$ will now serve as bearings in conjunction with the peripheries of the shackle bolt bearings 14 and 16, thus taking all the weight and wear off the shackle connections and eliminating the lost motion ordinarily occasioned by the spaces 14$^c$ and 16$^c$ of Figure 2.

To positively retain the thrust members 24 in their proper position, spacer devices must be provided. I have provided spacer members 26 formed of sheet metal or the like and having spacer elements 28 thereon for engaging the thrust members 24, as shown in Figures 4 and 5. The covers 26 may be secured in position by a bolt 31 or the like and to hold one member 26 spaced from the other they may engage the shackle bolt bearings 14 and 16 as shown in Figure 3. Each cover 26 has a flange 26$^a$ and a flange 26$^b$ for this purpose.

The cover members 26 effectively form a pocket in which absorbent material and lubricant 30 may be placed so that the shackle parts and shackle repair means may be effectively lubricated at all times and in fact the spring 12 itself may receive the benefit of such lubrication by reason of fluid lubricant seeping from the material 30 and along the leaves of the spring. In the upper cover plate 26, I provide a pocket 32 through which lubricating oil may be introduced for saturating the material 30.

The thrust members 24 may be provided with openings 25 where the shackles 22 are of the type having intermediate shackle bolts instead of two shackle bolts at the end of the shackles. The bolt 31 of course would be off-set to miss such an intermediate shackle bolt when the shackle repair means is installed on shackles of this character.

From the foregoing specification it will be obvious that I have provided a quickly installed shackle repair means and one which can be made much cheaper than a set of shackle bolts and shackle bolt sleeves. Furthermore, the bearing surfaces at 24$^a$ and 24$^b$ are on a greater radius and more substantial than the bearing surfaces at 14$^b$ and 16$^b$. It will be obvious to anyone who considers the invention that the thrust members 24 and cover members 26 may be much more quickly installed than the removal of the sleeves 14$^a$ and 16$^a$ and substitution of new ones usually by a press operation. The absorbent material and lubricant 30 form an efficient means for lubricating the shackle connections and repair means and is one which can be readily replenished with a supply of lubricant. Besides being desirable as a shackle repair means, my device may be used on new shackle connections to provide an improved shackle connection which will not wear out as fast as the type now in use.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. Spring shackle repair means comprising thrust members having cupped ends rigidly spaced from each other and adapted to be interposed between shackle bolt bearings to thereby support the weight of a vehicle instead of the shackles and shackle bolts thereof supporting said weight of the vehicle.

2. Spring shackle repair means comprising thrust members of rigid material having cupped ends which are always a predetermined distance apart.

3. For use with a vehicle having spring and horn eyes, a thrust member having cupped ends which are always a predetermined distance apart adapted to partially embrace said eyes and support the body of said vehicle on the chassis thereof.

4. Spring shackle repair means comprising spaced thrust members adapted to support the weight of a vehicle instead of the shackles and shackle bolts thereof, and covers spanning the distance between said thrust members to thereby form box-like pockets and absorbent material and lubricant in said pockets.

5. Spring shackle repair means comprising pairs of thrust members adapted to be interposed between and partially embrace bearings for the shackle bolts of shackles and adapted to rigidly retain said shackle bolt bearings a predetermined distance apart and thereby support the body of a vehicle in place of the shackles and shackle bolts thereof.

6. Spring shackle repair means comprising pairs of thrust members adapted to be interposed between bearings for the shackle bolts of shackles and adapted to rigidly retain said shackle bolt bearings a predetermined distance apart and thereby support the body of a vehicle in place of the shackles and shackle bolts thereof, said thrust members being positioned, each adjacent one of said shackles and spacer means for retaining them in such position.

7. Spring shackle repair means comprising pairs of thrust members adapted to be interposed between bearings for the shackle bolts of shackles and adapted to support the body of a vehicle in place of the shackles and shackle bolts thereof, said thrust members being positioned, each adjacent one of said shackles and spacer means for retaining them in such position, said spacer means forming pockets between said thrust members and absorbent material and lubricant in said pockets.

8. Spring shackle repair means comprising a pair of thrust members and a pair of covers having spacer elements projecting between said thrust members.

9. For use with spring shackles, repair means comprising a pair of thrust members and a pair of covers having spacer elements projecting between said thrust members, said covers having ends adapted to engage the bearings for the shackle bolts of said spring shackles.

10. For use with shackles, shackle bolts and shackle bolt bearings, a rigid thrust member adapted to be interposed between said bearings and having ends which are always a predetermined distance apart and which engage said bearings and partially embrace them to support one of them relative to the other.

11. For use with shackles, shackle bolts and shackle bolt bearings, a rigid thrust member adapted to be interposed between said bearings to support one of them relative to the other and a predetermined distance apart, said thrust member having cupped ends for fitting the peripheries of said bearings.

12. For use with shackles, shackle bolts and shackle bolt bearings, a pair of thrust members adapted to be interposed between and partially embrace said bearings to support one relative to the other and covers for said thrust members to form a pocket between them for absorbent material and lubricant.

13. For use with shackles, shackle bolts and shackle bolt bearings, a pair of thrust members adapted to be interposed between and partially embrace said bearings to support one relative to the other and covers for said thrust members engaging and partially embracing said bearings.

14. For use with shackles, shackle bolts and shackle bolt bearings, a pair of thrust members adapted to be interposed between said bearings to support one relative to the other and covers for said thrust members having spacer elements to retain each of said thrust members against one of said shackles.

15. For use with shackles, shackle bolts and shackle bolt bearings, a pair of thrust members adapted to be interposed between said bearings to support one relative to the other and covers for said thrust members and engaging said bearings, said covers having spacer elements to retain said thrust members spaced from each other.

MORRIS JENSEN.